F. KNOTT.
MOTION PICTURE MACHINE.
APPLICATION FILED APR. 18, 1910.
969,288.
Patented Sept. 6, 1910.
2 SHEETS—SHEET 1.
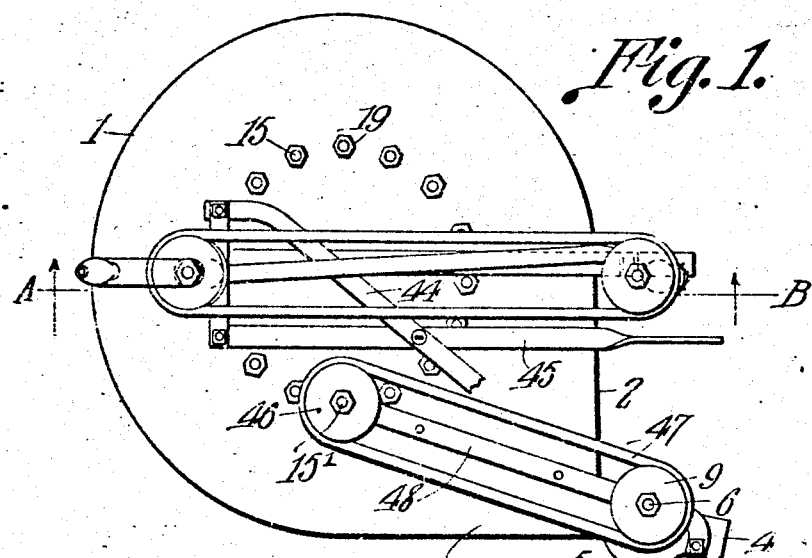
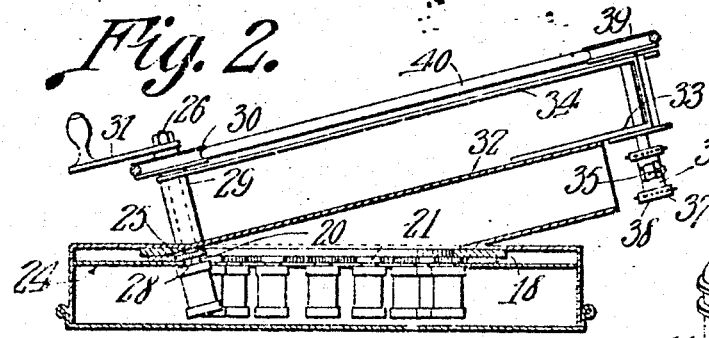
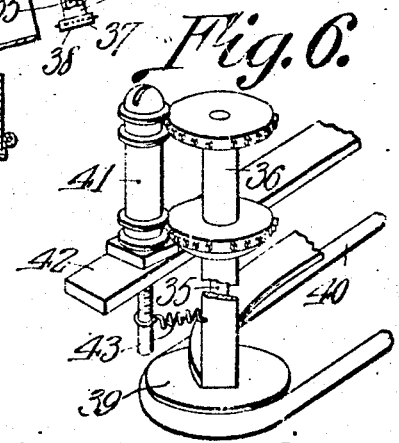
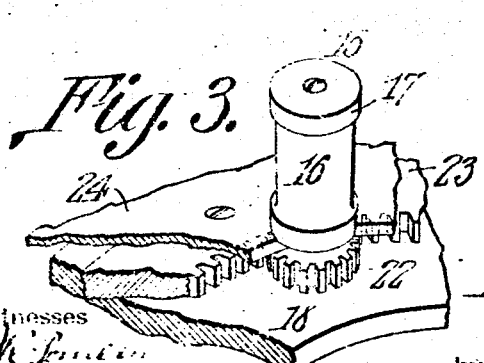
Witnesses
Frederick Knott,
Inventor.
by C. A. Snow & Co.
Attorneys

F. KNOTT.
MOTION PICTURE MACHINE.
APPLICATION FILED APR. 18, 1910.

969,288.

Patented Sept. 6, 1910.

2 SHEETS—SHEET 2.

Frederick Knott, Inventor.

by C. A. Snow & Co.
Attorneys

Witnesses

UNITED STATES PATENT OFFICE.

FREDERICK KNOTT, OF PORTLAND, OREGON, ASSIGNOR OF ONE-HALF TO KARL E. GREENAWALD, OF PORTLAND, OREGON.

MOTION-PICTURE MACHINE.

969,288.      Specification of Letters Patent.      Patented Sept. 6, 1910.

Application filed April 18, 1910. Serial No. 556,004.

*To all whom it may concern:*

Be it known that I, FREDERICK KNOTT, a citizen of the United States, residing at Portland, in the county of Multnomah and State of Oregon, have invented a new and useful Motion-Picture Machine, of which the following is a specification.

This invention has reference to improvements in motion picture machines and is designed to provide a reel case capable of containing a roll of films the ends of which may be joined so as to make the film continuous from end to end, feeding out of the case and passing through the light zone of the projecting apparatus and then returning to the case, the feeding devices engaging a comparatively large portion of the film so as to relieve the film from strain and danger of breaking.

Figure 4:
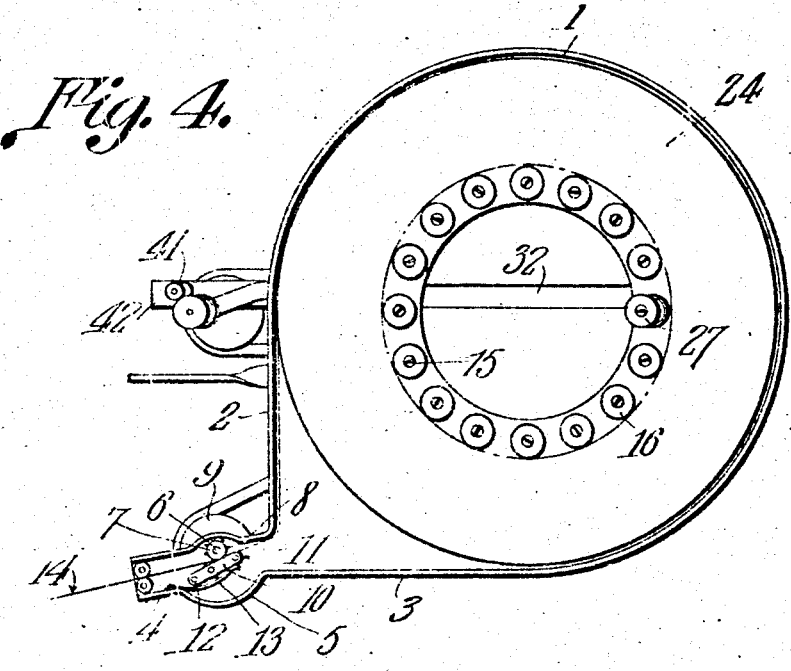
Figure 5:
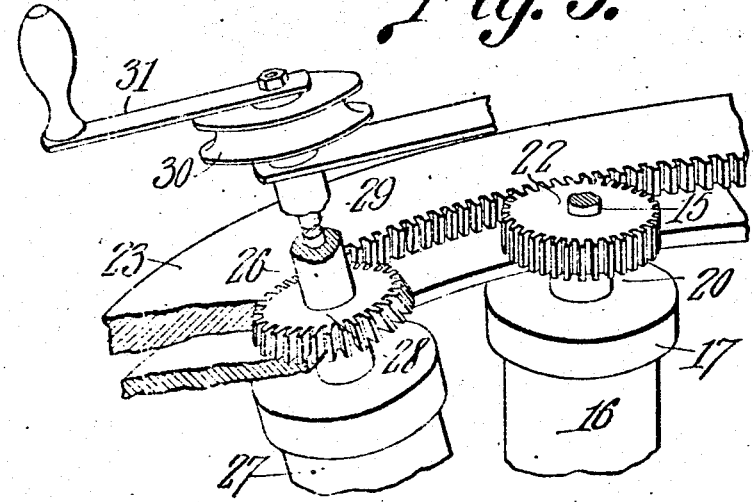

The invention will be best understood from a consideration of the following description taken in connection with the accompanying drawings forming a part of this specification, in which drawings:

Figure 1 is an elevation of the film casing. Fig. 2 is a section on the line A—B of Fig. 1. Fig. 3 is a perspective view of a portion of the interior structure of the casing. Fig. 4 is a view of the interior of the casing from the side opposite that shown in Fig. 1 and with the cover of the casing removed. Fig. 5 is a view of another portion of the interior structure of the casing showing the drive shaft and the continuation thereof to the exterior of the casing. Fig. 6 is an inverted perspective view of the film-engaging means at the outer end of the conduit leading to the center of the casing.

Referring to the drawings there is shown a casing 1 of general circular structure which casing is in practice made of a size to contain a roll of films such as are used in motion picture machines and of sufficient length to show a complete set of pictures or several sets of pictures continuously, the structure being such that a small length of the film is exterior to the casing where it is necessary to have the film pass through the light zone in order that the image of the film may be projected onto the screen. The depth of the casing is sufficient to contain the film roll and such mechanism as is necessary to carry such film roll.

At one point in the circumference of the casing the walls thereof are carried tangentially as shown at 2 and 3 respectively in approaching right angle relation and finally merge into the conduit 4 in substantially tangential arrangement to the casing.

The conduit 4 has an intermediate expanded portion 5 traversed by a shaft 6 upon which within the expanded portion 5 of the conduit 4 there is mounted a drum 7 having circular rows of radial pins 8 in spaced relation so as to engage in the usual marginal perforations in the film. Exterior to the conduit 4 the shaft 6 carries a pulley 9.

Adjacent to the drum 7 is a frame 10 upon which are mounted spaced rollers 11 in opposition to the drum 7 and this frame is pivotally supported on a rod 12 carried by the walls of the conduit 4. The rollers 11 are urged toward the roller or drum 7 by a suitable spring 13. The film indicated at 14 in Fig. 4 passes toward the right between the drum 7 and the rollers 11 and is held in engagement with the pins 8 by the action of the spring 13 urging the rollers 11 against the film on opposite sides of the axis of the drum 7. By this means the film is kept in positive engagement with the roller 7 having the pins extending through the perforations along the margin of the film.

Within the casing 1 in concentric relation to the axis of generation of the casing is a circular series of studs 15 upon each of which is mounted a roller 16 having circular ledges 17 near the ends designed to engage the marginal portions of the film so that the bodies of the rollers do not touch the film and so bring no pressure upon that portion of the film containing the photographic images. For the strengthening of the casing all the studs 15 may be mounted on a ring 18 and the studs may be carried through the back of the casing to there receive nuts 19 which bind the studs and ring 18 to the casing. Of course other means for securing the structure may be employed. Each roller 16 has a circumferential groove at one end beyond the adjacent ledge 17, this groove being indicated at 20 and beyond the groove the roller is either left plain as indicated at 21 or is formed into a gear pinion 22, certain of the rollers being provided with the pinions 22 and others being left plain as stated.

Surrounding the circular series of rollers 16 is an annular gear 23 in mesh with the pinions 22 but not interfered with by the plain extensions 21 since these are turned down to a sufficiently small diameter to avoid engagement with the gear 23.

The gear 23 carries a plate 24 having its inner edge extending into the grooves 20 and thereby holding all the rollers 16 to their pins or spindles 15. The diameter of the plate 24 is substantially the same as the interior diameter of the casing 1 so that this plate forms a support for the corresponding edge of the roll of films.

At one point in the ring 18 it is cut away as on a bevel as indicated at 25. This portion of the ring is traversed by a shaft 26 set at an angle to the axis of rotation of the rack 23. The end of the shaft 26 within the casing 1 carries a roller 27 similar to the rollers 16 and also having a groove 20 but this roller 16 is provided with a bevel pinion 28 so as to mesh with the teeth of the annular gear 23.

Fast on the exterior of the casing 1 is an elongated bearing 29 for the shaft 26 which latter extends through the bearing and beyond the same and there carries a pulley 30 and beyond the pulley has secured to it a crank handle 31 which however may be replaced by any driving means whereby rotation may be imparted to the shaft 26.

Fast to the face of the casing 1 traversed by the shaft 26 is a conduit 32 at an angle to said face and opening through the corresponding side of the casing to the interior thereof intermediate of the circular series of rollers slightly to one side of a diameter thereof, being in line with one edge of the roller 27 which latter is in substantially right angle relation to the length of the conduit 32. The outer end of the conduit 32 carries a bracket 33 bent on itself and having a continuation 34 leading to the bearing 29. Journaled in the bracket 33 and its continuation 34 is a shaft 35 carrying at the end adjacent to the conduit 32 a drum or roller 36 having end circular ledges 37 each with a circular series of radially projecting pins 38 in proper spaced relation to engage in the longitudinal series of perforations along the margins of the film. The end of the shaft 35 remote from that carrying the roller 36 is provided with a pulley 39 receiving motion from the pulley 30 by means of a belt 40.

The roller 36 is opposed by a roller 41 mounted on a pivoted arm 42 and urged toward the roller 36 by a suitable spring 43. The film 14 is adapted to traverse the conduit 32 and is engaged by the pins 38 on the roller 36, the film being held in engagement with the roller 36 by the pressure roller 41.

Suitable supporting members 44, 45 are made fast to the casing 1 whereby the casing may be secured to a motion picture projecting machine or to any structure adapted to support the casing.

Assuming that a roll of film is within the casing 1 and engaging the circular series of rollers 16, the inner turn of the film is carried around the inclined roller 27, this inclination being relative to the axes of the rollers 16, and from this roller 27 the film is carried through the corresponding face of the casing 1 into the conduit 32 and from the latter around the roller 36 through the projecting apparatus and back by the conduit 4 and then winds continuously on the exterior of the film roll within the casing.

In the particular structure shown every other roller 16 is positively driven although of course every roller may be positively driven or a less number of rollers may be positively driven. This positive drive is through the annular gear 23 which receives motion from the pinion 28 on the power shaft 26 and the latter may receive motion from the hand of an operator through the intermediary of the crank 31 or from any other suitable source of power.

The film roll is carried around by the plate 24 against which one edge of the roll rests and also by the actuated rollers 16 which move in the same direction as the plate 24 because of the internal circular rack 23 driving them.

One of the driven rollers 16 is made fast to the corresponding pin 15 which is journaled in the ring 18 and extends to the exterior of the casing. The particular pin 15 extending through the casing is indicated at 15' in Fig. 1 and this pin exterior to the casing carries a pulley 46 coupled by a belt 47 to the pulley 9 on the shaft 6. A stiffening bar 48 extends between the extended portion of the spindle 15' and the shaft 6 so as to overcome the pull of the belt 47. This bar 48 may be secured in any suitable manner to the corresponding portion of the casing 1. By this means the feed of the film at the conduit 4 is positive.

What is claimed is:—

1. In a film holder for motion picture machines, a film reel comprising a circular series of positively driven rollers.

2. In a film holder for motion picture machines, a film reel comprising a circular series of positively driven rollers and interposed idler rollers.

3. In a film holder for motion picture machines a film roller comprising a circular series of rollers each having a gear pinion thereon and an annular driving gear therefor exterior to the pinions.

4. In a film holder for motion picture machines, a film reel comprising a circular series of rollers, each having a gear pinion thereon, an annular driving gear therefor exterior to the pinions, and a circular series of idler rollers interspersed in the first named series of rollers.

5. In a film holder for motion picture machines a film reel comprising a circular series of rollers each with a circumferential groove near one end, journal supports for said rollers, and a plate exterior to the rollers and having one edge extending into the grooves of said rollers, said plate constituting a support for one edge of the film.

6. In a film holder for motion picture machines a film reel comprising a circular series of positively driven rollers and interposed idler rollers, the said rollers each being provided with a circumferential groove near one end, and a film supporting plate exterior to the rollers and having its inner edge inset into the grooves in said rollers.

7. In a film holder for motion picture machines, a film reel comprising a circular series of positively driven rollers and interposed idler rollers each having a circumferential groove near one end, an annular rack exterior to the rollers and engaging the positively driven rollers, and a film supporting plate carried by the rack and entering the grooves in the rollers.

8. In a film holder for motion picture machines, a film reel comprising a circular series of rollers provided at one end with gear pinions, an internal gear surrounding the circular series of pinions and in mesh therewith, a drive shaft at an angle to the internal gear and a roller mounted on said drive shaft and provided with a bevel gear engaging the internal gear, said bevel gear being fast on the drive shaft.

9. In a film holder for motion picture machines a suitable casing provided with a central and a peripheral passage-way or conduit, film feeding means in operative relation to the conduit, and exterior to the casing, a circular series of film supporting rollers in said casing, means for driving the rollers, a drive shaft for the roller driving means extending to the exterior of the casing and carrying within the casing a film directing roller in line with one of the conduits, and driving connections between the drive shaft and the film feeding means coacting with the conduit.

10. In a film holder for motion picture machines, a suitable casing, film driving means at the exit and entrance parts of the casing, film driving means within the casing supporting and actuating the film, and connections between said driving means within and exterior to the casing moving said driving means in proper timed relation.

In testimony that I claim the foregoing as my own, I have hereto affixed my signature in the presence of two witnesses.

FREDERICK KNOTT.

Witnesses:
L. B. REEDER,
H. ALLEN.